(12) United States Patent
Sanns, Jr.

(10) Patent No.: US 9,234,753 B2
(45) Date of Patent: Jan. 12, 2016

(54) FLUID OR LOW FRICTION PERMANENT MAGNET COMPASS

(71) Applicant: Frank Sanns, Jr., Pittsburgh, PA (US)

(72) Inventor: Frank Sanns, Jr., Pittsburgh, PA (US)

( * ) Notice: Subject to any disclaimer, the term of this patent is extended or adjusted under 35 U.S.C. 154(b) by 189 days.

(21) Appl. No.: 13/920,287

(22) Filed: Jun. 18, 2013

(65) Prior Publication Data

US 2014/0366391 A1    Dec. 18, 2014

(51) Int. Cl.
*G01C 17/18* (2006.01)
*G01C 17/06* (2006.01)
*G01C 17/08* (2006.01)

(52) U.S. Cl.
CPC ............... *G01C 17/18* (2013.01); *G01C 17/06* (2013.01); *G01C 17/08* (2013.01)

(58) Field of Classification Search
CPC .................................. G01C 17/08; G01C 17/18
USPC .......................................................... 33/364
See application file for complete search history.

(56) References Cited

U.S. PATENT DOCUMENTS

| | | | |
|---|---|---|---|
| 1,614,228 A | | 1/1927 | Breed |
| 1,754,055 A | * | 4/1930 | Senter .............................. 33/364 |
| 2,350,402 A | * | 6/1944 | Krasnow et al. ................ 33/364 |
| 3,011,264 A | * | 12/1961 | Parera .............................. 33/364 |
| 3,068,583 A | * | 12/1962 | Goshen ............................ 33/345 |
| 3,084,443 A | * | 4/1963 | Kaatz et al. .................... 356/140 |
| 3,286,358 A | * | 11/1966 | Smokowski ..................... 33/364 |
| 3,373,498 A | * | 3/1968 | Chabbert ......................... 33/364 |
| 3,568,329 A | * | 3/1971 | Campbell ........................ 33/364 |
| 3,888,016 A | | 6/1975 | Fowler |
| 3,956,831 A | * | 5/1976 | Sibley .............................. 33/352 |
| 4,227,313 A | | 10/1980 | Hennessy |
| 4,357,756 A | * | 11/1982 | DeGaeta et al. ............ 33/355 R |
| 4,848,002 A | * | 7/1989 | Carmona et al. ................ 33/364 |
| 4,905,377 A | * | 3/1990 | Martinez et al. ................ 33/333 |
| 5,079,846 A | * | 1/1992 | Iden ................................. 33/364 |
| 5,477,470 A | | 12/1995 | Lewis |
| 2011/0138641 A1 | | 6/2011 | Lozares |

* cited by examiner

*Primary Examiner* — Christopher Fulton
(74) *Attorney, Agent, or Firm* — Spilman Thomas & Battle PLLC; William P. Smith

(57) ABSTRACT

Low friction or nearly frictionless compasses are provided. One compass embodiment includes a housing having a wall forming a chamber, the housing having a closed end and an open end. The compass includes a fluid disposed within the chamber. The compass includes a magnetized material floating in the fluid, wherein the magnetized material is operative to indicate Earth's magnetic north. The compass includes a protective face adjacent to the open end, wherein the protective face closes the open end of the chamber. Also provided is a compass that includes low friction material deposited on at least one side of the magnetized material and the adjacent closed end of the housing to create a nearly frictionless interface.

18 Claims, 5 Drawing Sheets

FLUID OR LOW FRICTION PERMANENT MAGNET COMPASS

BACKGROUND

This application generally relates to compasses, and more particularly to, fluid or low friction compasses including a magnetized material that is buoyant or nearly buoyant.

A magnet in a compass uses the weak magnetic field of the Earth to align it with the poles of the earth. The torque force to align the magnet with the Earth's magnetic field is very low. As such, friction on the indicating magnet must be kept very low or the magnet will not exert sufficient force to overcome the friction.

Typical compasses include an arrow or solid disk that is suspended or supported on a needle point at the center of gravity. The needle point or suspension provides an ultra-low friction point that corresponds with the axis of torque rotation. When a needle point is used the center of the magnet has to be supported or suspended to work, thereby limiting the geometry of the magnet such that magnets having hollow centers cannot be used.

It would be desirable to provide a simpler more reliable fluid or low friction magnetic compass free from geometric limitations.

SUMMARY

In one embodiment, a low friction compass is provided. The compass includes a housing having a wall forming a chamber. The chamber includes an open end and a closed end. A magnetized material is adjacent the closed end and the magnetized material is operative to indicate Earth's magnetic north.

In another embodiment, a compass is provided. The compass includes a housing having a wall forming a chamber, the housing having a closed end and an open end. The compass includes a fluid disposed within the chamber. A buoyant or near buoyant magnetized material floats in the fluid and is operative to indicate Earth's magnetic north. A protective face is adjacent to the open end, thereby closing the open end of the chamber.

In yet another embodiment, a compass is provided with a low friction coating. The compass includes a housing forming a chamber, the housing having a closed end and an open end. The closed end of the housing includes a low friction material deposited thereon. The low friction compass includes a magnetized material having the low friction coating material deposited on at least one side with the coated side being adjacent to the closed end of the chamber. The magnetized material is operative to align with Earth's magnetic field.

In yet another embodiment, a compass having a nearly buoyant spinner is provided. The compass includes a housing forming a chamber, the housing having a closed end and an open end. The compass includes a fluid disposed within the chamber. The compass includes a magnetic assembly floating in the fluid, wherein the magnetic assembly includes a magnetized material surrounded by an inner density reducing member and an outer density reducing member, the magnetized material being operative to indicate Earth's magnetic north. The compass includes a protective face adjacent to the open end, wherein the protective face closes the open end of the chamber.

The strength of permanent magnets have improved substantially over the years so that current magnets may create sufficient force to overcome the friction that prevents rotation for magnets capable of producing only weak torque. In addition, lower friction surfaces have been developed giving even more options for the geometry of compasses. This disclosure describes a compass that can be made of varied geometries that do not require being supported or suspended in the geometric center of the magnet. An example of this technology would be a sufficiently strong thin ring magnet that is buoyant in a fluid, is levitated, or has such low friction with the surface that it is supported by that rotation in the Earth's magnetic field. It is also recognized that any changes in the magnetic field of the compass can also be detected including presence of other para-, meta-, or ferro-magnetic materials or other magnets, or presence or changes in external magnetic fields.

Certain advantages of the embodiments described herein include a low friction compass.

Another advantage is simpler and sturdier compass.

Yet another advantage is that the compass may include any number of magnet shapes and magnet configurations.

Another advantage is a compass having a magnetized material that is not limited by shape and that the magnetized material may include a hollow center.

Alternative exemplary embodiments relate to other features and combinations of features as may be generally recited in the claims.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

DETAILED DESCRIPTION OF THE EXEMPLARY EMBODIMENTS

In one embodiment, a compass is provided. The compass includes a housing having a wall forming a chamber, the housing having a closed end and an open end. The compass includes a magnetized material in the chamber and adjacent the closed end, wherein the magnetized material is operative to indicate Earth's magnetic north.

In another embodiment, a compass is provided. The compass includes a housing having a wall forming a chamber, the housing having a closed end and an open end. The compass includes a fluid disposed within the chamber. The compass includes a magnetized material floating in the fluid, wherein the magnetized material is operative to indicate Earth's magnetic north. The compass includes a protective face adjacent to the open end, wherein the protective face closes the open end of the chamber.

In yet another embodiment, a low friction compass is provided. The low friction compass includes a housing forming a chamber, the housing having a closed end and an open end, wherein the closed end includes a low friction material deposited thereon. The low friction compass includes a magnetized material having the low friction material deposited on at least one side, the at least one side being adjacent to the closed end of the chamber, wherein the magnetized material is operative to indicate Earth's magnetic north.

Figure 1:
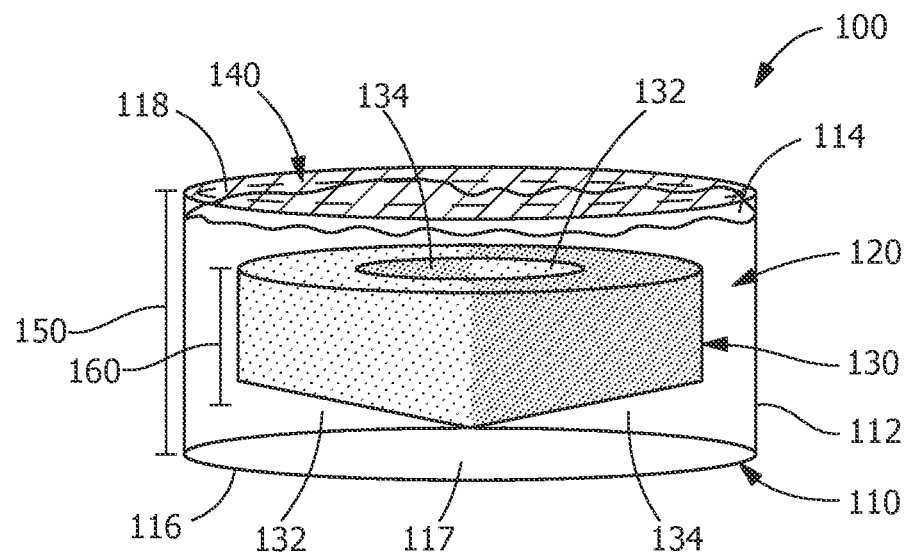
FIG. 1 is a side view of a compass according to an exemplary embodiment of the present disclosure.

Referring to FIG. 1, a compass 100 is provided. Compass 100 includes a housing 110 having a wall 112 forming a chamber 114. Housing 110 includes a closed end 116 and an open end 118. Housing 110 is made from any suitable material, such as, but not limited to glass, polymers, ceramic, minerals, crystal, and non-magnetic metal. In one embodiment, when compass 100 is incorporated into a bezel watch face or other rugged display, housing 110 may be synthetic sapphire (aluminum oxide $Al_2O_3$). Height or thickness, labeled 150, of housing 110 is large enough to contain magnetized material 130 and fluid 120. In one embodiment, height or thickness 150 of housing 110 is about 1 millimeter to about 10 millimeters. In one embodiment, housing 110 is circular and has a diameter from about 20 millimeters to about 60 millimeters or alternatively from about 30 millimeters to about 50 millimeters or alternatively about 31 millimeters to about 45 millimeters. In one embodiment, interior surface 117 of closed end 116 of housing 110 is flat. In an alternative embodiment, interior surface 117 of closed end 116 of housing, may be, for example, angled, V-shaped, concave, convex, rounded, comb-shaped, or any suitable configuration or combination thereof. Chamber 114 may have any suitable polyhedron or 3-dimensional shape configuration, such as, but not limited to, cuboid (rectangular), cylindrical, cubical (square), triangular, spherical, and octahedral.

In one embodiment, fluid 120 is disposed within chamber 114. Amount of fluid 120 disposed in chamber 114 may almost fully or partially fill chamber 114. Fluid 120 includes fluids having a density of greater than of the magnetized material 130. In an alternative embodiment, fluids 120 are fluids having a density that is greater than a lower density material that is coated or is laminated to surface of magnetized material 130. In one embodiment, the lower density material coated on magnetized material 130 is selected from polymers that have an inherent density of 1 g/cc or a little less. In an alternative embodiment, lower density material may be a closed cell foamed version of the same polymers that can have densities of significantly less than 1 g/cc because of air entrainment. Suitable examples of lower density materials, include, but are not limited to, polyolefin, polyester, polyurethane, polytetrafluoroethylene, epoxy, polyphenylene oxides/sulfides, polyamides. The lower density material may optionally be reinforced for strength, durability, density and friction, and may further include, for example, but not limited to, hollow glass spheres, molybdenum disulphide, polytetrafluoroethylene (TEFLON®), and graphite. In one embodiment, the density of fluid 120 is about 1 g/cc to about 18.5 g/cc. Suitable examples of fluid 120 include, but are not limited to, water (~1 g/cc), aqueous sodium tunstate (~2.8 g/cc), mercury (~18.5 g/cc), alcohols, silicone fluids, organics, such as glycerine, mineral oil, synthetic oil and combinations thereof. In one embodiment, salts may be added to fluid 120 to increase density of aqueous solutions. In another embodiment, other additives may be added to fluid 120 to provide additional buoyancy and lubrication. In one embodiment, fluid 120 may be a gaseous liquid, such as, but not limited to butane, propane, methane, ammonia, helium, nitrogen, oxygen, or a combination thereof.

Magnetized material 130 floats or is buoyant or near buoyant in the fluid 120, as such, the density of the magnetized material 130 is approximately less than that of fluid 120. Without being bound by theory, it is believed that the use of the fluid 120 provides buoyancy which reduces friction on the magnetized material 130. Generally, friction on the magnetized material 130 is proportional to the coefficient of friction and the force normal to the surface, where F=uN (F=force, u=coefficient of friction, N=normal force which in a gravitational field is mass x gravitational acceleration (mg)). Again without being bound by theory, it is believed that buoyancy or partial buoyancy reduces the normal force and thus reduces the friction on the magnetized material 130, allowing magnetized material 130 to freely move in fluid 120. Magnetized material 130 is operative to indicate Earth's magnetic north. Magnetized material 130 includes at least one North Pole 132 and at least one South Pole 134. In one embodiment, magnetized material 130 includes an "N" marked on the surface at the North Pole and an "S" marked on the surface at the South Pole (see FIG. 3). In one embodiment, magnetized material 130 is a rare earth magnet, selected from rare earth materials, such as, but not limited to, neodymium and samarium-cobalt. In another embodiment, magnetized material 130 is a permanent magnet, and includes, but is not limited to, neodymium iron boron ($Nd_2Fe_{14}B$) magnets, samarium-cobalt, Alnico, ferrite, and polymer materials with magnetic powder dispersed throughout. In one embodiment, magnetized material 130 is a diametrically magnetized ring having North Pole 132 and South Pole 134. Magnetized material 130 may have any suitable shape, such as, but not limited to, rings, torus, tubes (axis through hollow center), hollow squares, hollow diamonds, or hollow triangles. Magnetized material 130 has a thickness 160 of about 1 millimeter to about 10 millimeters, or alternatively about 2 millimeters to about 9 millimeters, or alternatively about 3 millimeters to about 8 millimeters. In one embodiment, magnetized material 130 is circular in shape and has a diameter from about 20 millimeters to about 60 millimeters, or alternatively from about 30 millimeters to about 50 millimeters, or alternatively about 31 millimeters to about 45 millimeters. In one embodiment, surface of magnetized material 130 adjacent to closed end 116 of housing 110 may be, for example, angled, V-shaped, or convex, allowing for a natural or self-centering of magnetized material 130 in chamber 114.

Figure 3:
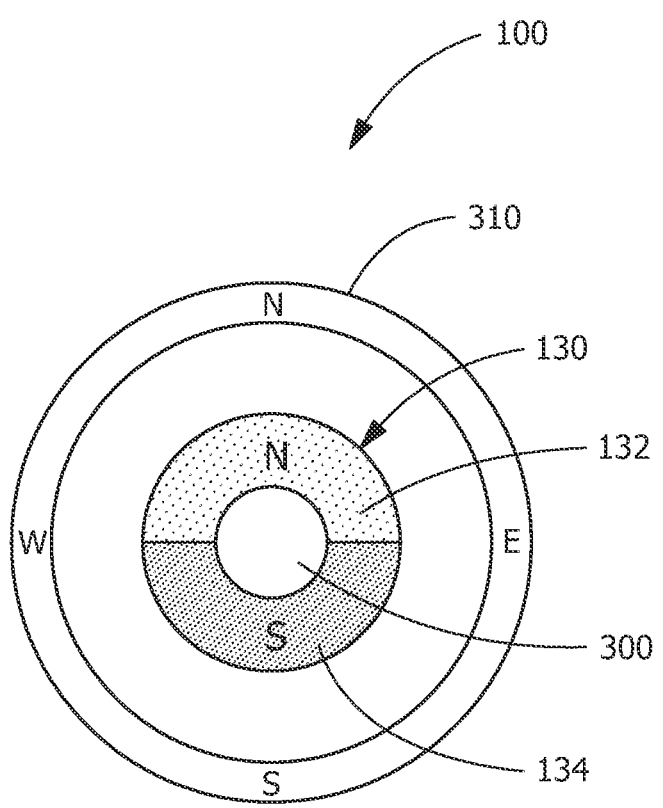
FIG. 3 is a top view of a compass according to exemplary embodiment of the present disclosure.

In one embodiment, magnetized material 130 includes a hollow portion 300 (see FIG. 3). In another embodiment, hollow portion 300 may be constructed from a material having a density less than that of the density of the fluid. Hollow portion 300 may be filled with air and sealed, thereby effectively decreasing the density of magnetized material 130 allowing it to float in fluid 120. In one embodiment, magnetized material 130 is itself, or part of a structure that reduces the effective density of the magnetized material (see FIG. 3). Hollow portions or the magnet or the structure that contains it (see FIG. 6.) may be filled with, including but not limited to, air, pressurized air, nitrogen, vacuum and sealed, thereby effectively decreasing the density of magnetized material 130 allowing magnetized material 130 to float in fluid 120. Suitable examples of material used to construct hollow portion 300 or other portions of compass, such as inner or outer density reducing members 402 or 404, housing 610, closed end 616, and protective face 640 may include, but are not limited to, polyolefin, polyester, polyurethane, polytetrafluoroethylene, epoxy, polyphenylene oxides/sulfides, polyamides, aluminum, stainless steel, titanium, magnesium, and combinations thereof (see FIG. 6).

As shown in FIG. 1, compass 100 includes a protective face 140 adjacent to and covering open end 118. Protective face 140 closes open end 118 of chamber 114. Protective face 140 may be any suitable material, such as, but not limited to, plastic or glass. In one embodiment, compass 100 may also help reduce the friction while providing damping to any external mechanical perturbations.

Figure 2:
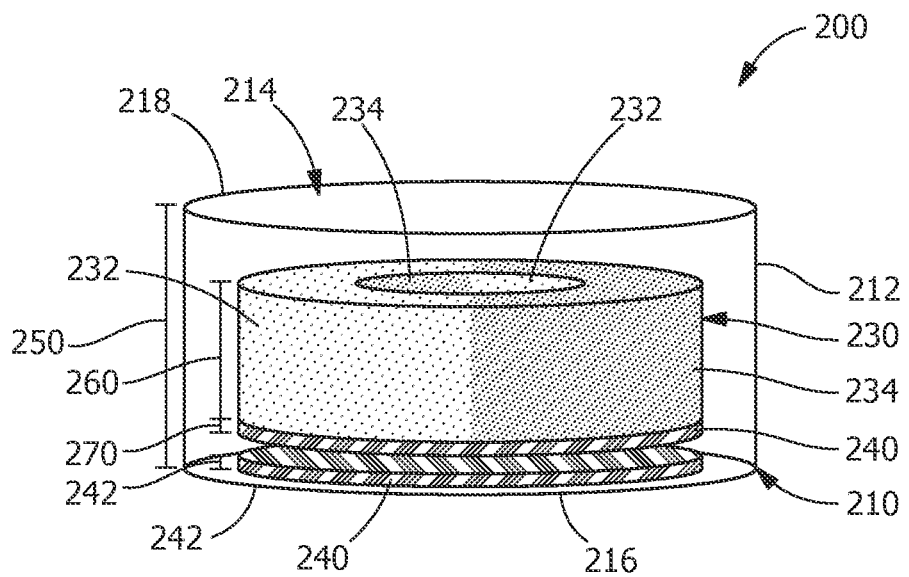
FIG. 2 is a side view of a low friction compass according to an exemplary embodiment of the present disclosure.

Referring to FIG. 2, a low friction compass 200 is provided. Low friction compass 200 depends on strength of magnetized material 230 and friction forces. Low friction compass 200 includes a housing 210 having a wall 212 forming a chamber 214. Housing 210 includes a closed end 216 and an open end 218. Housing 210 is made from any suitable material, such as, but not limited to glass, polymers, ceramic, minerals, crystal, and non-magnetic metal. In one embodiment, when compass 200 is incorporated into a bezel watch face or other rugged display, housing 210 may be synthetic sapphire (aluminum oxide $Al_2O_3$). Height or thickness, labeled 250, of housing is large enough to contain magnetized material 230. In one embodiment, height or thickness 250 is about 1 millimeter to about 10 millimeters. Chamber 214 may have any suitable polyhedron or 3-dimensional shape configuration, such as, but not limited to, cuboid (rectangular), cylindrical, cubical (square), triangular, spherical, octahedral. Closed end 216 of housing 210 includes a low friction material 240 deposited on the surface 242.

Suitable examples of low friction material 240, include, but are not limited to, graphite, nearly frictionless carbon, polytetrafluoroethylene (TEFLON®), and combinations thereof. Low friction materials 240 are materials having a coefficient of friction of less than 1.0, or alternatively less than 0.5 or alternatively less than 0.3. A magnetized material 230 is adjacent to and generally in contact with low friction material 240 on closed end 216 of housing. Magnetized material 230 may have the low friction material 240 deposited on at least one side, with the side including the low friction material 240 deposit being adjacent to closed end 216 of the housing 210. In one embodiment, low friction material 240 is the same as that deposited on closed end 216 of housing 210. In an alternative embodiment, low friction material 240 deposited on magnetized material 230 is different than what is deposited on surface 242 of closed end 216 of housing 210. In operation, low friction material 240 on both closed end 216 of housing and magnetized material 230, allows magnetized material 230 to easily overcome frictional forces to indicate the direction of Earth's magnetic field. The low friction material 240 provides a near "frictionless" interface between housing 210 and magnetized material 230 allowing the magnetized material 230 to indicate Earth's magnetic north. In one embodiment, low friction material 240 deposited on the closed end 216 and at least one side of the magnetized material 230 has a thickness of about 0.0004 microns (4 Angstroms) to about 1000 microns, or alternatively about 0.5 microns to about 500 microns, or alternatively about 0.5 microns to about 100 microns or alternatively about 0.5 microns to about 10 microns. Magnetized material 230 includes at least one North Pole 232 and at least one South Pole 234. In one embodiment, magnetized material 230 includes an "N" marked on the surface at the North Pole and an "S" marked on the surface at the South Pole (see FIG. 3). In one embodiment, magnetized material 230 is a diametrically magnetized ring having North Pole 232 and South Pole 234. In one embodiment, magnetized material 230 is a rare earth magnet, selected from rare earth materials, such as, but not limited to, neodymium and samarium-cobalt. In another embodiment, magnetized material 230 is a permanent magnet, and includes, but is not limited to, neodymium iron boron ($Nd_2Fe_{14}B$) magnets, samarium-cobalt, Alnico, ferrite, and polymer materials with magnetic powder dispersed throughout. Magnetized material 230 may have any suitable shape, such as, but not limited to, rings, torus, tubes (axis through hollow center), hollow squares, hollow diamonds, or hollow triangles. In one embodiment, magnetized material 230 has a thickness 260 of about 1 millimeter to about 10 millimeters or alternatively about 2 millimeters to about 9 millimeters, or alternatively about 3 millimeters to about 8 millimeters. In one embodiment, low friction compass 200 may include a protective face adjacent to and covering open end 218 (not shown). Protective face closes open end 218 of the chamber 214.

FIG. 3 is a top view of one embodiment of the present disclosure. As shown, a bezel 310 may surround the outside of housing 130 of compass 100. Bezel 310 may include markings such as "N" indicating North, "S" indicating South, "E" indicating East, and "W" indicating West. In an alternative embodiment, a single dot may be included on bezel 310 to indicate north (not shown).

Figure 4:
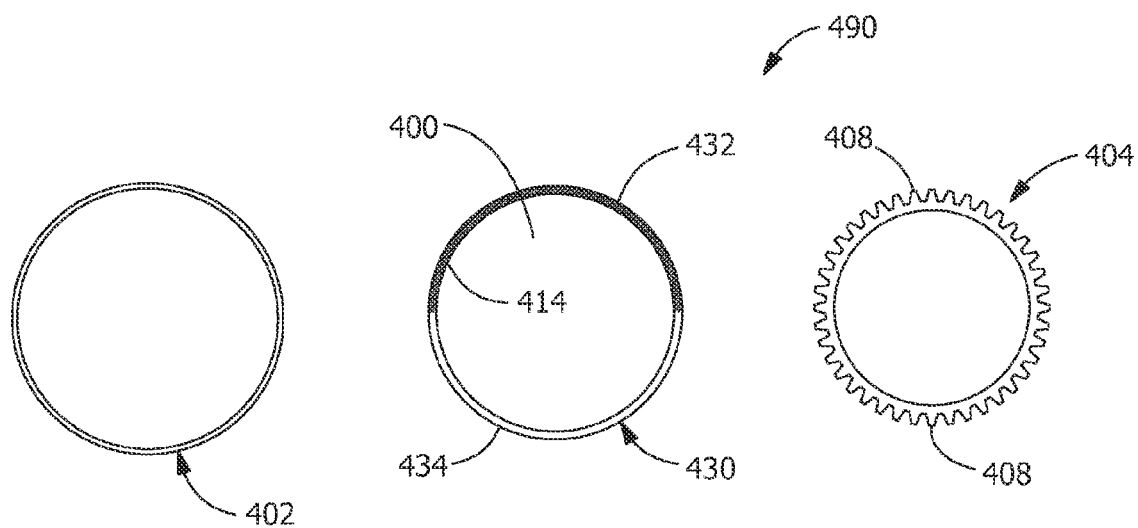
FIG. 4 is a top view of the components of a magnetic assembly.
Figure 5:
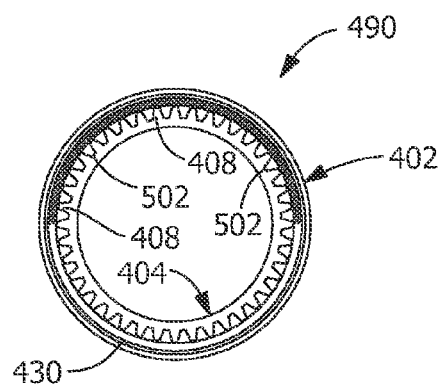
FIG. 5 is top view of the assembled components of the magnetic assembly of FIG. 4
Figure 6:
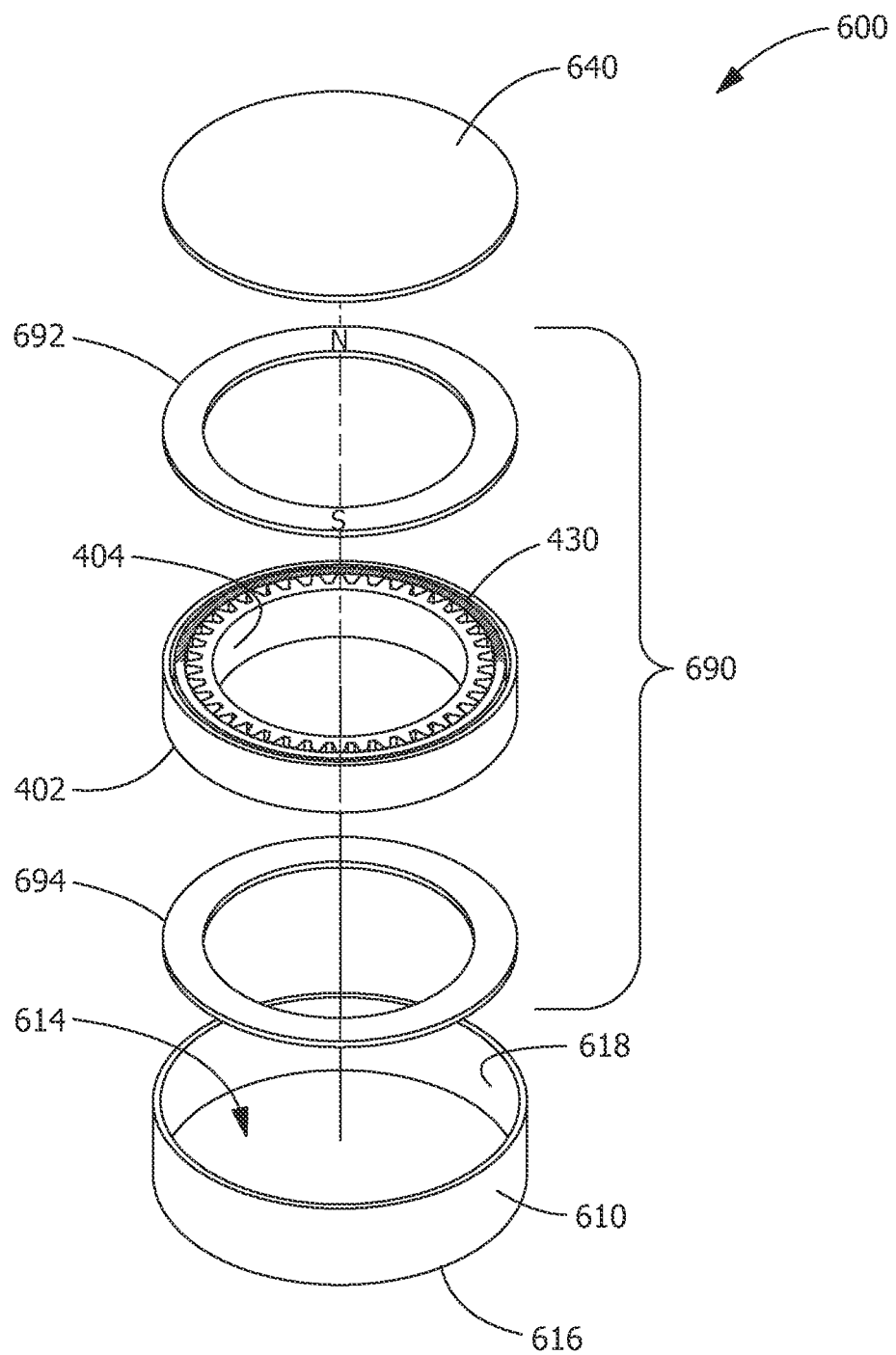
FIG. 6 is an exploded view of a compass according to an exemplary embodiment of the present disclosure.

FIGS. 4-6 illustrate another exemplary embodiment of a compass 600 of the present disclosure. Compass 600 has a nearly buoyant spinner or magnetic assembly 690. As shown in FIG. 6, compass 600 includes a housing 610 forming a chamber 614 with a closed end 616 and an open end 618. When compass 600 is assembled, a fluid (not shown) is disposed within chamber 614. A magnetic assembly 690 floats in the fluid. Fluids are selected from materials that have a density greater than that of magnetic assembly 690. In one embodiment, the density of fluid is about 1 g/cc to about 18.5 g/cc. Suitable examples of fluid include, but are not limited to, water (~1 g/cc), aqueous sodium tunstate (~2.8 g/cc), mercury (~18.5 g/cc), alcohols, silicone fluids, organics, such as glycerine, mineral oil, synthetic oil and combinations thereof. In one embodiment, salts may be added to fluid to increase density of aqueous solutions. In another embodiment, other additives may be added to fluid to provide additional buoyancy and lubrication. In one embodiment, fluid may be a gaseous liquid, such as, but not limited to butane, propane, methane, ammonia, helium, nitrogen, oxygen, or a combination thereof.

As shown in FIGS. 4-5 magnetic assembly 490 includes a magnetized material 430 surrounded by an inner density reducing member 404 and an outer density reducing member 402. The magnetized material 430 is operative to indicate Earth's magnetic north. Magnetized material 430 may have any suitable shape, including a hollow portion 400, such as, but not limited to, rings, torus, tubes (axis through hollow center), hollow squares, hollow diamonds, or hollow triangles. In one embodiment, magnetized material 430 is a diametrically magnetized ring having a North Pole 432 and South Pole 434. In one embodiment, magnetized material 430 is a rare earth magnet, selected from rare earth materials, such as, but not limited to, neodymium and samarium-cobalt. In another embodiment, magnetized material 430 is a permanent magnet, and includes, but is not limited to, neodymium iron boron ($Nd_2Fe_{14}B$) magnets, samarium-cobalt, Alnico, ferrite, and polymer materials with magnetic powder dispersed throughout.

Outer density reducing member 402, in one embodiment, completely surrounds magnetized material 430, see FIG. 5. In an alternative embodiment, outer density reducing member 402 partially surrounds magnetized material 430 (not shown). Outer density reducing member 402 is generally the same or similar in shape to magnetized material 430. Outer density reducing member 402 has a density that is less than that of fluid. For example, but not limited to, outer density reducing member 402 may be selected from ultra-high-molecularweight polyethylene, rigid foam polyurethane closed cell (having a density of 0.9 g/cc-1 g/cc), polyester, epoxides, sulfones, polyphenylene sulfides, polytetrafluoroethylene (TEFLON®), metals, such as, for example, stainless steel, nickel, titanium, aluminum. In one embodiment, outer density reducing member may be selected from any material having a density that is less than that of fluid and that is a high strength material having a low coefficient of friction.

Inner density reducing member 404, in one embodiment, is adjacent to the inner surface of hollow portion 400 of magnetized material. In one embodiment, inner density reducing member 404, is adjacent to inner diameter of magnetized material 430. Inner density reducing member 404 includes a plurality of projections 408. When magnetic assembly 490 is assembled, see FIG. 5, plurality of projections 408 of inner density reducing member 404 are in contact with inner surface 436 of magnetized material 430, creating a plurality of gaps 502. Plurality of gaps 502 hold air when top and bottom of magnetic assembly 490 are hermetically sealed. Plurality of gaps 502 may be any shape Inner density reducing member 404 has a density that is less than that of fluid. In one embodiment, inner density reducing member 404 is selected from ultra-high-molecular-weight polyethylene. In an alternative embodiment, as shown in FIG. 6, magnetic assembly 690 includes a top density reducing member 692 and bottom density reducing member 694 adjacent to and hermetically sealing the top and bottom of magnetic assembly 690. Top and bottom density reducing members 692 and 694 are generally shaped similar to magnetized material 430. Top and bottom density reducing members 692 and 694 are selected from materials that have a density less than that of fluid. In one embodiment, top and bottom density reducing members 692 and 694 are made from ultra-high-molecular-weight polyethylene. As shown in FIG. 6, top density reducing member 692 includes a North marker. Top and bottom density reducing members 692 and 694 may include any suitable or desired graphics. Protective face 640 is adjacent to open end 618 and hermetically seals magnetic assembly 690 and fluid in chamber 614 forming compass 600. In an alternative embodiment, housing 614 includes two open ends 618 and chamber 614 may be formed using a bottom cap (not shown).

Without being bound by theory, it is believed that the magnetic assembly 690 reduces the spinner portion of the compass 600 so that the normal force is greatly reduced. Magnetic assembly 690 is generally buoyant in fluid and has very little friction in fluid.

Figure 7:
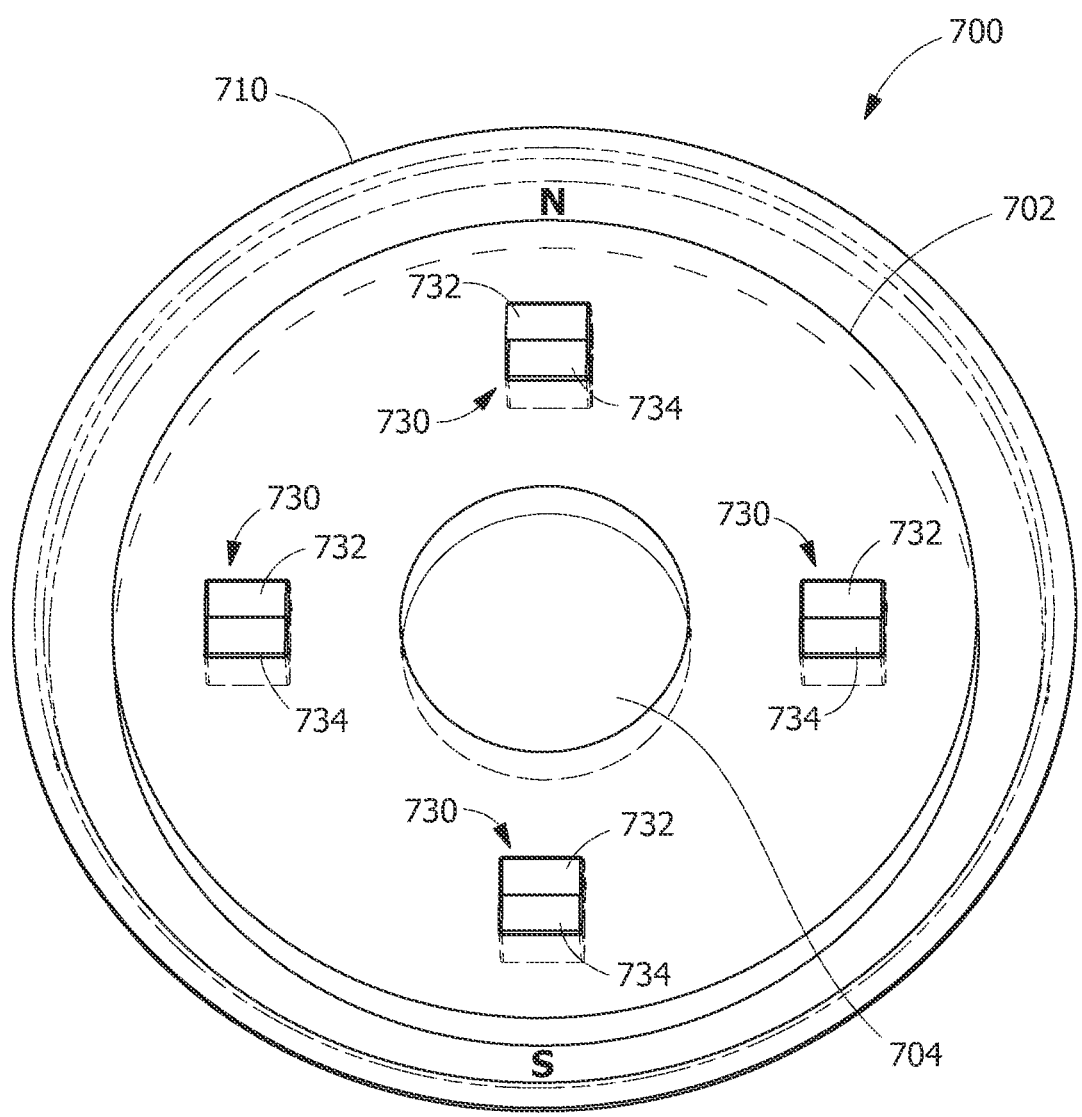
FIG. 7 is a top view of a compass according to an exemplary embodiment of this present disclosure.

As shown in FIG. 7, compass 700 includes magnetized material 730 as a plurality of magnets, the magnetized material 730 operating in the same manner as described above. Compass includes a housing 710 that has a wall forming a chamber with a closed end and an open end (see FIG. 1). A fluid as described above is disposed within the chamber (see FIG. 1). Magnetized material 730 floats or is generally buoyant in the fluid, and the magnetized material 730 is indicative to operate Earth's magnetic north. As shown in FIG. 7, magnetized material 730 is a plurality of small magnets, each having a North Pole 732 and a South Pole 734. In one embodiment, as few as two magnets and up to an infinite number of magnets, resulting in a solid magnet, as described and shown above (see FIG. 1), may make up the magnetized material 730. The plurality of magnets forming magnetized material 730 are arranged to provide a North/South orientation. In one embodiment, as depicted, the plurality of magnets are arranged such that all of the magnets are in the same orientation, in an alternative embodiment, the plurality of magnets may be arranged in a Halbach Array, such that each subsequent magnet is rotated 90° to provide an overall North/South orientation. The magnetized material 730, as a plurality of magnets, is attached to a density reducing member 702 in any suitable manner, such as, but not limited to, gluing, welding, epoxies or combinations thereof. Density reducing member 702 includes a hollow portion 704. Density reducing member 702 is selected from any suitable material that has density that is less than fluid. Density reducing member 702 allows magnetized material 730 to be generally buoyant in fluid. Using a plurality of magnets allows for any suitable shape to be given to density reducing member 702, such as, for example, a star, where one of the plurality of magnets forming magnetized material 730 is present on each point of the star.

In one embodiment, magnetized material may be a high tech electromagnet with leads. In one embodiment, the compasses of the present disclosure may be embedded in bezel watch faces or rugged displays.

It should be understood that the application is not limited to the details or methodology set forth in the above description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

What is claimed is:

1. A compass comprising:
   a housing having a wall forming a chamber, the housing having a closed end and an open end;
   a fluid disposed within the chamber;
   a partially buoyant magnetized material floating in the fluid, wherein the magnetized material is operative to indicate Earth's magnetic north;
   a hollow portion extending through the magnetized material; and
   a protective face adjacent to the open end, wherein the protective face closes the open end of the chamber.

2. The compass of claim 1, wherein the magnetized material has a density that is less than a density of the fluid disposed within the chamber.

3. The compass of claim 1, wherein the magnetized material is selected from neodymium iron boron or samarium-cobalt.

4. The compass of claim 1, wherein the magnetized material further includes a coating, the coating including a material having a density that is less than the density of the fluid.

5. The compass of claim 4, wherein the material is selected from graphite, nearly frictionless carbon, polytetrafluoroethylene, and combinations thereof.

6. The compass of claim 1, wherein the hollow portion is sealed and filled with air.

7. The compass of claim 1 wherein the hollow portion is filled with a material having a density less than that of the density of the fluid.

8. The compass of claim 1, wherein the fluid is selected from water, sodium tungstate, tribromomethane, mercury, liquefied gases, and combinations thereof.

9. The compass of claim 1, wherein the magnetized material includes a plurality of magnets.

10. The compass of claim 1, wherein the magnetized material comprises a shape selected from the group consisting of a ring, a torus, a tube, a hollow square, a hollow diamond, and a hollow triangle.

11. A low friction compass comprising:
   a housing forming a chamber, the housing having a closed end and an open end, wherein the closed end includes a low friction material deposited thereon; and
   a magnetized material having the low friction material deposited on at least one side, the at least one side being adjacent to the closed end of the chamber, wherein the magnetized material is operative to indicate Earth's magnetic north.

12. The low friction compass of claim 11, wherein the magnetized material has a hollow center.

13. The low friction compass of claim 11, wherein the magnetized material is selected from neodymium iron boron or samarium-cobalt.

14. The low friction compass of claim 11, wherein the low friction material is selected from graphite, nearly frictionless carbon, or polytetrafluoroethylene.

15. The low friction compass of claim 11, wherein the magnetized material has a thickness of about 1 millimeter to about 10 millimeters.

16. The low friction compass of claim 11, wherein a low friction material deposited on the closed end and at least one side of the magnetized material has a thickness of about 0.0004 microns to about 1000 microns.

17. A compass comprising:
   a housing forming a chamber, the housing having a closed end and an open end;
   a fluid disposed within the chamber;
   a partially buoyant magnetic assembly floating in the fluid, wherein the magnetic assembly includes a magnetized material surrounded by an inner density reducing member and an outer density reducing member, the magnetized material being operative to indicate Earth's magnetic north;
   a hollow portion extending through the magnetic assembly; and
   a protective face adjacent to the open end, wherein the protective face closes the open end of the chamber.

18. The compass of clam 17, wherein the magnetic assembly further includes a top density reducing member and bottom density reducing member adjacent to the magnetized material and inner and outer density reducing members.

\* \* \* \* \*